(12) United States Patent
He et al.

(10) Patent No.: US 12,356,046 B2
(45) Date of Patent: Jul. 8, 2025

(54) COMMENT ADDING METHOD AND APPARATUS, ELECTRONIC DEVICE AND STORAGE MEDIUM

(71) Applicant: Beijing Zitiao Network Technology Co., Ltd., Beijing (CN)

(72) Inventors: Zitong He, Beijing (CN); Shuai Wang, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/892,094

(22) Filed: Sep. 20, 2024

(65) Prior Publication Data

US 2025/0016423 A1 Jan. 9, 2025

Related U.S. Application Data (63) Continuation of application No. PCT/CN2023/081628, filed on Mar. 15, 2023.

(30) Foreign Application Priority Data

Mar. 21, 2022 (CN) .......................... 202210281115.7

(51) Int. Cl.
*H04N 21/4788* (2011.01)
*H04N 21/431* (2011.01)
*H04N 21/488* (2011.01)

(52) U.S. Cl.
CPC ..... *H04N 21/4788* (2013.01); *H04N 21/4312* (2013.01); *H04N 21/4884* (2013.01)

(58) Field of Classification Search
CPC .......... H04N 21/4788; H04N 21/4312; H04N 21/4884
See application file for complete search history.

(56) References Cited

U.S. PATENT DOCUMENTS

2013/0145269 A1 6/2013 Latulipe et al.
2013/0328932 A1* 12/2013 Kim ................. H04N 21/41407
709/204

(Continued)

FOREIGN PATENT DOCUMENTS

CN 101930779 A 12/2010
CN 104811816 A 7/2015

(Continued)

OTHER PUBLICATIONS

Hong et al., "Video user group classification based on barrage comments sentiment analysis and clustering algorithms", Computer Engineering & Science, vol. 40, No. 6, Jun. 6, 2018, 15 pages, with English Abstract.

(Continued)

*Primary Examiner* — Alazar Tilahun
(74) *Attorney, Agent, or Firm* — Astute IP Law Group (57) ABSTRACT

Disclosed in embodiments of the present disclosure are a bullet screen adding method and apparatus, an electronic device and a storage medium. The method includes: in response to a bullet screen adding request for a video, displaying a bullet screen editing interface, wherein a video preview picture of the video is displayed on the bullet screen editing interface; and in response to a bullet screen editing operation, displaying preview information of the bullet screen on the video preview picture displayed on the bullet screen editing interface, wherein the bullet screen is an associated bullet screen of an object in the video.

19 Claims, 7 Drawing Sheets

```
A bullet screen editing interface is displayed in response to
an adding request for a bullet screen for a video, wherein a     110
video preview picture of the video is displayed on the bullet
screen editing interface.
```

```
In response to the bullet screen editing operation, the preview
information of the bullet screen is displayed on the video
preview picture displayed on the bullet screen editing           120
interface, wherein the bullet screen is an associated bullet
screen of the object in the video.
```

(56) References Cited

U.S. PATENT DOCUMENTS

| | | | |
|---|---|---|---|
| 2018/0132007 A1 | 5/2018 | Chou et al. | |
| 2021/0185386 A1* | 6/2021 | Kong | H04N 21/4394 |
| 2022/0360841 A1* | 11/2022 | Tian | H04N 21/458 |
| 2022/0385979 A1* | 12/2022 | Zhou | G06F 40/30 |

FOREIGN PATENT DOCUMENTS

| | | |
|---|---|---|
| CN | 107613402 A | 1/2018 |
| CN | 108076374 A | 5/2018 |
| CN | 108235105 A | 6/2018 |
| CN | 108347640 A | 7/2018 |
| CN | 108419140 A | 8/2018 |
| CN | 108810642 A | 11/2018 |
| CN | 109558018 A | 4/2019 |
| CN | 110351593 A | 10/2019 |
| CN | 111294663 A | 6/2020 |
| CN | 111601174 A | 8/2020 |
| CN | 112328091 A | 2/2021 |
| CN | 112804582 A | 5/2021 |
| CN | 306541629 S | 5/2021 |
| CN | 113542854 A | 10/2021 |
| CN | 114679628 A | 6/2022 |
| JP | 2010124179 A | 6/2010 |
| WO | 2022022196 A1 | 2/2022 |

OTHER PUBLICATIONS

International Search Report for PCT/CN2023/081628, mailed Jun. 13, 2023, 6 pages.
Notice of Allowance for Chinese Patent Application No. 202210281115.7, mailed Mar. 22, 2024, 8 pages.
Office Action for Chinese Patent Application No. 202210281115.7, mailed Jul. 6, 2023, 16 pages.
Extended European Search Report for European Patent Application No. 23773672.3, mailed on Mar. 7, 2025, 14 pages.

* cited by examiner

COMMENT ADDING METHOD AND APPARATUS, ELECTRONIC DEVICE AND STORAGE MEDIUM

CROSS-REFERENCE TO RELATED APPLICATIONS

This application is a Continuation Application of International Patent Application No. PCT/CN2023/081628, filed on Mar. 15, 2023, which is based on and claims the benefit of Chinese Patent Application for invention No. 202210281115.7, filed on Mar. 21, 2022, which are hereby incorporated by reference in their entireties into the present application.

TECHNICAL FIELD

The present disclosure relates to the field of information technology, in particular to a comment adding method and apparatus, an electronic device and a storage medium.

BACKGROUND

With the continuous development of terminal technology and network technology, more and more application clients emerge. The user may carry out different online activities through different types of application clients.

For example, the user may watch videos through video application clients. During the process of watching videos, the user may also post bullet screen (bullet comments) for the video content.

SUMMARY

In a first aspect, the embodiment of the present disclosure provides a comment adding method. The method comprises: displaying a comment editing interface in response to an adding request for a comment for a video, wherein a video preview picture of the video is displayed on the comment editing interface; and displaying the preview information of the comment on the video preview picture displayed on the comment editing interface in response to a comment editing operation, wherein the comment is an associated comment of an object in the video.

In a second aspect, the embodiment of the present disclosure also provides a comment adding apparatus. The apparatus comprises: a first display module configured to display a comment editing interface in response to an adding request for a comment for a video, wherein a video preview picture of the video is displayed on the comment editing interface; and a second display module configured to display the preview information of the comment on the video preview picture displayed on the comment editing interface in response to a comment editing operation, wherein the comment is an associated comment of an object in the video.

In a third aspect, the embodiment of the present disclosure also provides an electronic device. The electric device comprises: one or more processors; and a storage means for storing one or more programs that, when executed by the one or more processors, cause the one or more processors to implement the comment adding method as described above.

In a fourth aspect, the embodiment of the present disclosure also provides a computer program product. The computer program product comprises a computer program or instructions that, when executed by a processor, implement the comment adding method as described above.

BRIEF DESCRIPTION OF THE ACCOMPANYING DRAWINGS

The above-described and other features, advantages and aspects of embodiments of the present disclosure will become more apparent in conjunction with the accompanying drawings and with reference to the following detailed description. Throughout the accompanying drawings, the same or similar reference numerals indicate the same or similar elements. It should be understood that the accompanying drawings are schematic, and the members and elements are not necessarily drawn to scale.

DETAILED DESCRIPTION

The embodiments of the present disclosure will be described in more detail with reference to the accompanying drawings below. Although the accompanying drawings illustrate some embodiments of the present disclosure, it should be understood that the present disclosure may be implemented in various forms, and should not be construed as being limited to the embodiments set forth herein. Rather, these embodiments are intended for a more thorough and complete understanding of the present disclosure. It should be understood that the accompanying drawings and embodiments of the present disclosure are only for illustrative purposes, rather than for limiting the protection scope of the present disclosure.

It should be understood that the various steps recited in the method embodiments of the present disclosure may be performed according to different sequences and performed in parallel. In addition, the method embodiments may comprise additional steps and/or omit to perform the illustrated steps. The scope of the present disclosure is not limited in this respect.

As used herein, the term "comprise" and its variants are open-ended inclusion, that is, "comprise but not limited to". The term "based on" means "at least partially based on". The term "one embodiment" means "at least one embodiment"; the term "another embodiment" means "at least one additional embodiment"; and the term "some embodiments" means "at least some embodiments". The related definitions of other terms will be given in the following description.

It should be noted that the concepts such as "first" and "second" mentioned in the present disclosure are only used to distinguish different devices, modules or units, but not to limit the order or interdependence of functions performed by these devices, modules or units.

It should be noted that the modifications of "one" and "a plurality of" mentioned in the present disclosure are illustrative rather than restrictive, and those skilled in the art should understand that they should be understood as "one or more" unless contextually specified otherwise.

The names of messages or information exchanged between multiple devices in the embodiments of the present disclosure are only used for illustrative purposes, but not for limiting the scope of these messages or information.

At present, the interactive function of bullet screen is relatively simple and impossible to meet diversified needs of the user, so that the user experience is affected.

In order to solve the above-described technical problem or at least partially solve the above-described technical problem, the embodiments of the present disclosure provides a bullet screen adding method and apparatus, an electronic device and a storage medium, so as to realize a new solution to add bullet screen, which is conductive to improving the bullet screen adding effect and the use experience of the user. In the present disclosure, a bullet screen is a comment.

Figure 1:
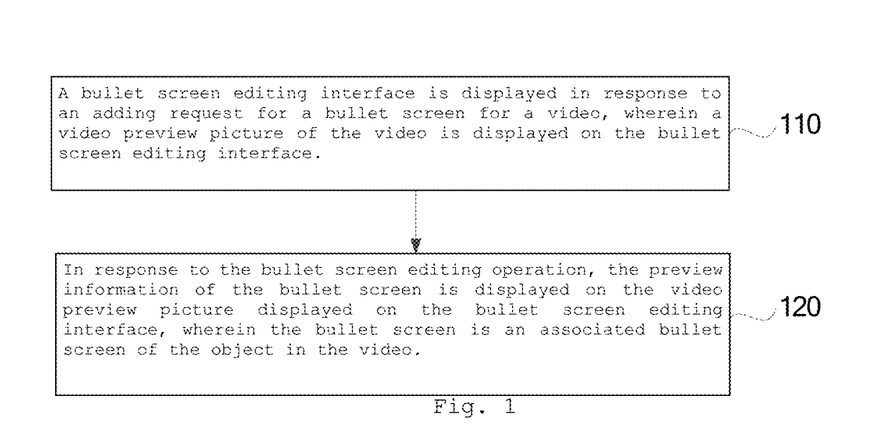
FIG. 1 is a flowchart of a bullet screen adding method in an embodiment of the present disclosure.

FIG. 1 is a flowchart of a bullet screen adding method in an embodiment of the present disclosure. The bullet screen adding method may be performed by a bullet screen adding apparatus, which may be implemented by software and/or hardware, and which may be configured in an electronic device. The electronic device comprises, for example, terminals, which specifically comprise, but are not limited to, a smart phone, a palmtop computer, a tablet computer, a portable wearable device, a smart home device (for example, a desk lamp), and the like.

As shown in FIG. 1, the bullet screen adding method specifically comprises the following steps.

In Step 110, a bullet screen editing interface is displayed in response to an adding request for a bullet screen for a video, wherein a video preview picture of the video is displayed on the bullet screen editing interface.

The adding request for the bullet screen may be triggered by operating a bullet screen adding control, which may be displayed on a playback picture or video detail page of the video, so that the user may conveniently trigger the bullet screen adding control when watching the video, so as to call up the bullet screen editing interface of the bullet screen (which may be referred to as the first bullet screen editing interface for editing the bullet screen). The bullet screen is added on the video through the bullet screen editing interface of the bullet screen.

Different from a conventional bullet screen, the bullet screen in the embodiments of the present disclosure is an associated bullet screen of the object in the video. In some embodiments, the bullet screen is a monologue bullet screen, that is, the object in the video as a speaker to express the monologue information corresponding to the object. For example, the object is an airplane, and the bullet screen may be "airplane: I am so cool". For another example, the object is a disk of lemons, and the bullet screen may be "lemon: I am so sour!". In other words, the bullet screen is to simulate the monologue of the object in the video, so as to intensify the fun of the bullet screen and enhance the interactive experience of the user. It may be understood that, the user may choose the object independently, for example, the object is "sofa", "lemon", "pet kitty", "gourmet dishes", "clothes" and the like in the playback picture of the video.

In some embodiments, the step of displaying the bullet screen editing interface of the bullet screen in response to an adding request for the bullet screen for the video comprises: displaying a bullet screen control in response to a user having an access to add the bullet screen; displaying a bullet screen editing interface of the bullet screen in response to a trigger operation for a bullet screen control. For example, when the user becomes a fan club member of a poster of the video, the user may obtain an access to add the bullet screen, which of course is not only limited thereto. Thus, it is conductive to enhancing the interactive atmosphere without affecting the live viewing atmosphere of the video.

In some embodiments, in response to the user obtaining an access to add the bullet screen, a prompt message is displayed to guide the user to take part in the bullet screen interaction and enrich the interaction experience. For example, based on the prompt message, it is possible to directly switch to the bullet screen editing interface of the bullet screen or switch to the interface where the bullet screen adding control is displayed, so as to simplify the operation path and improve the operation efficiency.

Figure 2:
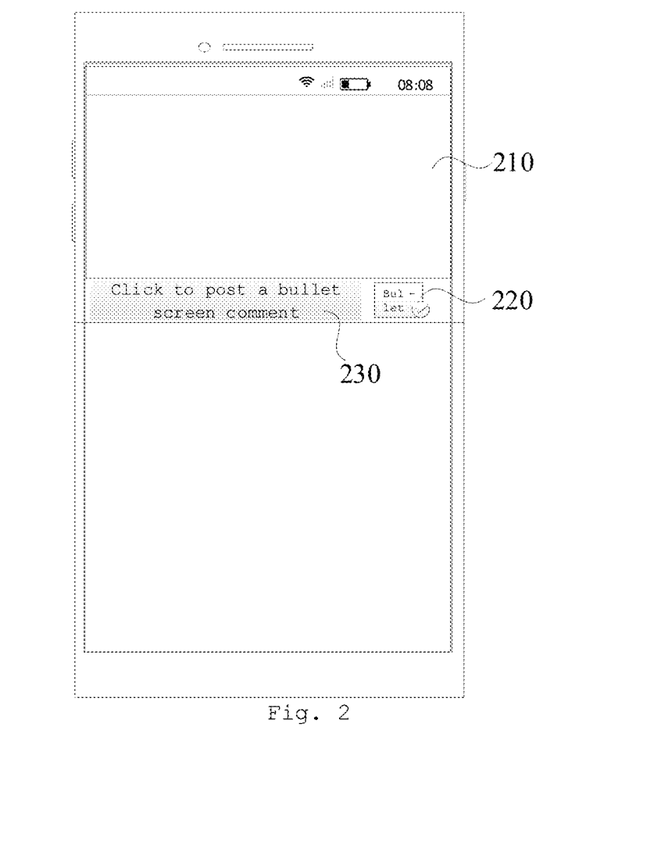
FIG. 2 is a schematic view of a video playback interface in an embodiment of the present disclosure.
Figure 3:
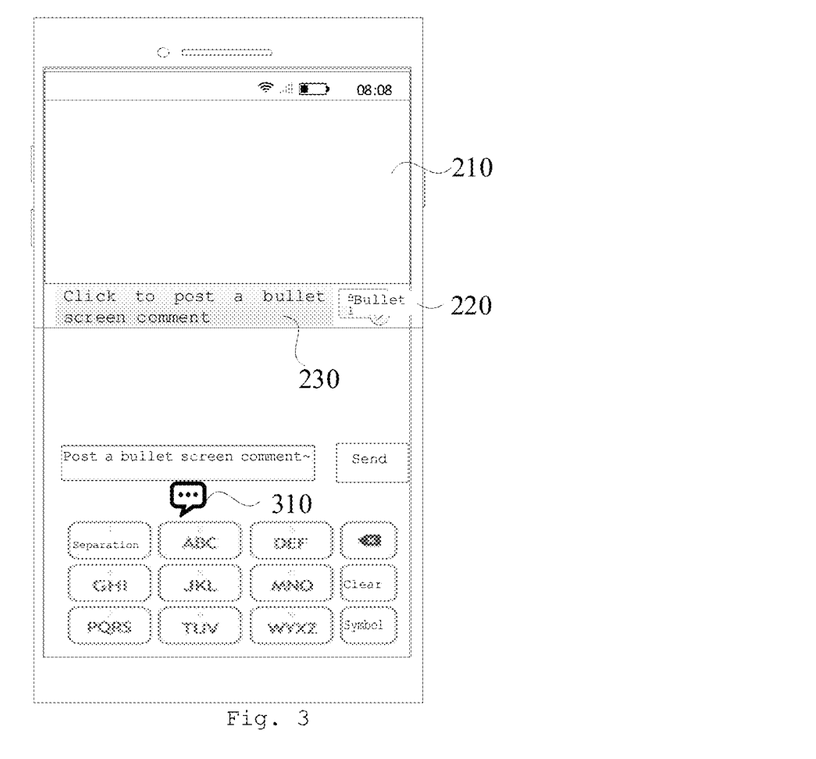
FIG. 3 is a schematic view of a bullet screen editing interface in an embodiment of the present disclosure.

In some embodiments, referring to a schematic view of a video playback interface (or a video details page) as shown in FIG. 2, it comprises a playback window 210 of the video and a bullet screen switch identifier 220. When the user triggers the bullet screen switch identifier 220, the bullet screen function is enabled and the bullet screen entrance 230 is displayed. In response to triggering the bullet screen entrance 230, a bullet screen editing panel (which may be referred to as the second bullet screen editing interface for editing a conventional bullet screen) as shown in FIG. 3 may be displayed. Based on the bullet screen editing panel, the conventional bullet screen may be edited, but the bullet screen cannot be edited. If the user has an access to add the bullet screen, the bullet screen adding control 310 is displayed on the bullet screen editing panel. By triggering the bullet screen adding control 310, the bullet screen editing interface of the bullet screen is displayed. The bullet screen adding control 310 may also be directly displayed on the video details page or the video playback page.

In Step 120, in response to the bullet screen editing operation (the bullet screen editing operation for the video), the preview information of the bullet screen is displayed on the video preview picture displayed on the bullet screen editing interface, wherein the bullet screen is an associated bullet screen of the object in the video.

Compared with the related art in which the display effect of the bullet screen may only be viewed after the bullet screen is sent, the display effect of the bullet screen may be previewed in real time through the video preview picture of the bullet screen editing interface during the bullet screen editing process before the bullet screen is sent, so as to facilitate the user to make an adjustment in time before the bullet screen is sent, which is conductive to better satisfying the needs of the user and improving the experience of the user.

In some embodiments, a bullet screen editing box is also displayed on the bullet screen editing interface of the bullet screen, wherein the bullet screen editing box is configured to edit the bullet screen.

The bullet screen is an associated bullet screen of the object, and the bullet screen may be a bullet screen having an associated relationship with the object. In some embodiments, the bullet screen may be displayed at an associated position of the object, or the bullet screen comprises the associated identification information of the object, for example, the bullet screen content in the bullet screen box comprises the name of the object, or the bullet screen is directed to the object when displayed, for example, the bullet screen has a bullet screen box which is directed to the object.

In some embodiments, a plurality of style options are also displayed on the bullet screen editing interface; in response to a trigger operation for a style option among the plurality of style options, a style corresponding to the style option is taken as a display style of the bullet screen. That is, the display style of the bullet screen may be set by triggering the style option, thereby improving the visual effect of the bullet screen, reducing the editing difficulty of the bullet screen and enhancing the interactive experience.

Figure 4:
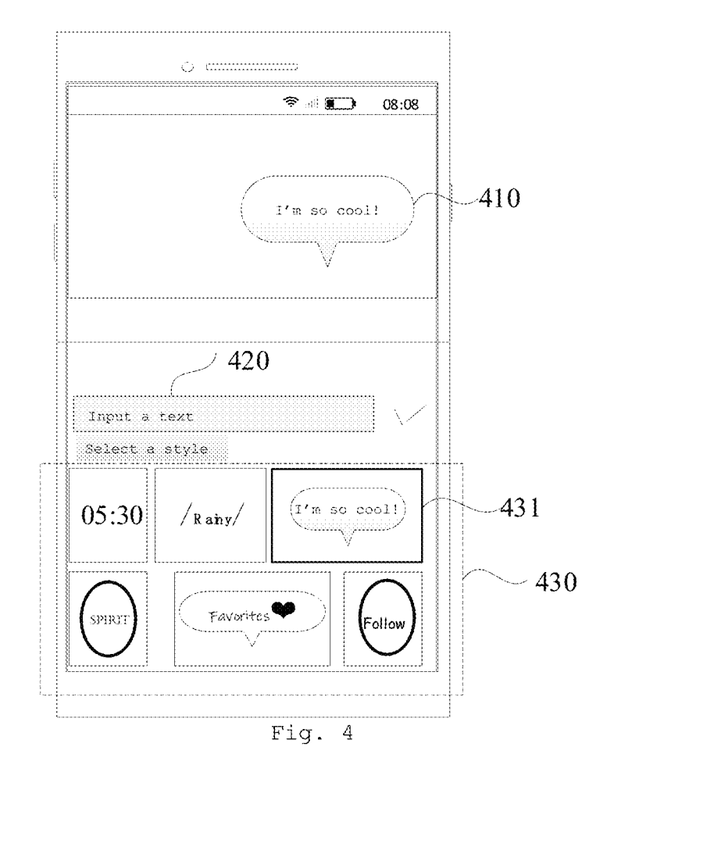
FIG. 4 is a schematic view of a bullet screen editing interface in an embodiment of the present disclosure.
Figure 5:
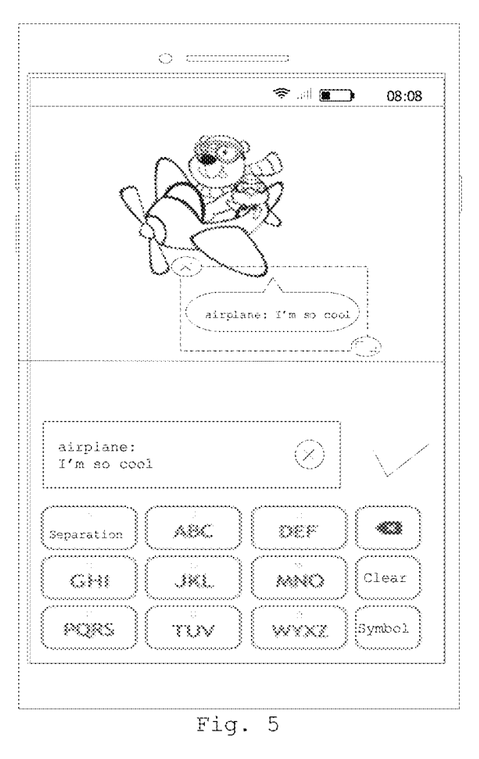
FIG. 5 is a schematic view of a bullet screen editing interface in an embodiment of the present disclosure.

For example, referring to a schematic view of a bullet screen editing interface of a bullet screen as shown in FIG. 4, a video preview picture 410 of the video, a bullet screen editing box 420 and a plurality of style options 430 are displayed on the bullet screen editing interface. In response to the style option 431 being triggered, a style corresponding to the style option 431 is displayed on the video preview picture 410. In response to the style option 431 comprising a text edited in advance, in addition to a style corresponding to the style option 431, the text edited in advance (the text may be used as the bullet screen) comprised in the style option 431 may also be displayed on the video preview picture 410. In this way, it is possible to simplify the editing operation of the user and improve the bullet screen adding efficiency. If the style option 431 does not comprise a text edited in advance, in response to the style option 431 is triggered, only a style corresponding to the style option 431 will be displayed on the video preview picture 410, and the bullet screen may be edited through the bullet screen editing box 420, the bullet screen edited in the bullet screen editing box 420 will be displayed in the video preview picture 410 synchronously with a style corresponding to the style option 431. In the bullet screen editing interface of the bullet screen as shown in FIG. 5, the bullet screen content in the bullet screen box comprises the name "airplane" of the object and "I'm so cool" for expressing the monologue of the airplane, in which the symbol ":" is used to further simulate the scene where the airplane expresses the monologue.

Figure 6:
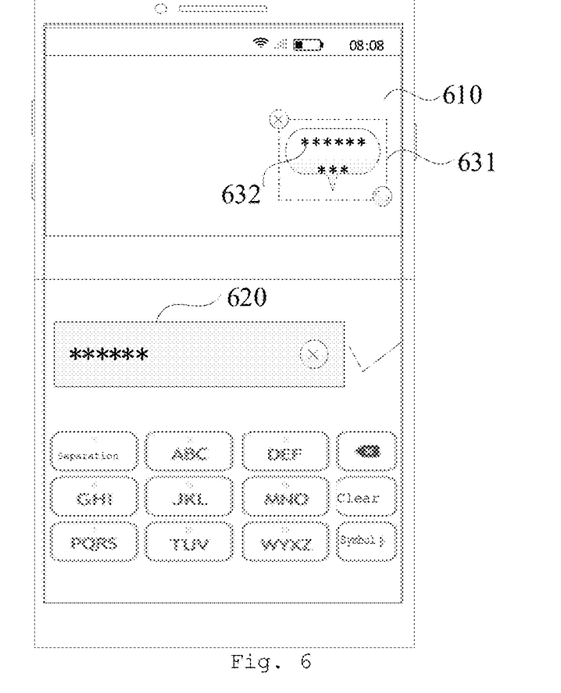
FIG. 6 is a schematic view of a bullet screen editing interface in an embodiment of the present disclosure.

In some embodiments, the preview information of the bullet screen comprises a bullet screen preview box and/or a bullet screen preview content, and the bullet screen preview box is displayed according to an adjusted style in response to an adjustment operation for a style of the bullet screen and/or the bullet screen preview content is displayed according to an adjusted content in response to an adjustment operation for a content of the bullet screen. For example, referring to a schematic view of a bullet screen editing interface of a bullet screen as shown in FIG. 6, it comprises a video preview picture 610 of the video, a bullet screen editing box 620 and the preview information of the bullet screen displayed on the video preview picture 610, and the preview information of the bullet screen comprises a bullet screen preview box 631 and a bullet screen preview content 632. The user may drag the bullet screen preview box 631 to change the size of the bullet screen preview box 631, move the bullet screen preview box 631 to change a position of the bullet screen preview box 631 on the video preview picture 610, or delete the bullet screen preview box 631. The user may also edit the bullet screen preview content 632, such as deleting, adding or setting the font, font size, color and the like of the bullet screen preview content 632.

In order to facilitate the user to adjust an adding position of the bullet screen in the video and a display duration of the bullet screen in the video, in some embodiments, the video track of the video and the bullet screen track of the bullet screen are displayed on the bullet screen editing interface; a video frame corresponding to the bullet screen is determined in response to an adjustment operation for the bullet screen track to display the bullet screen on a video playback picture corresponding to the video frame during a playback process of the video.

Figure 7:
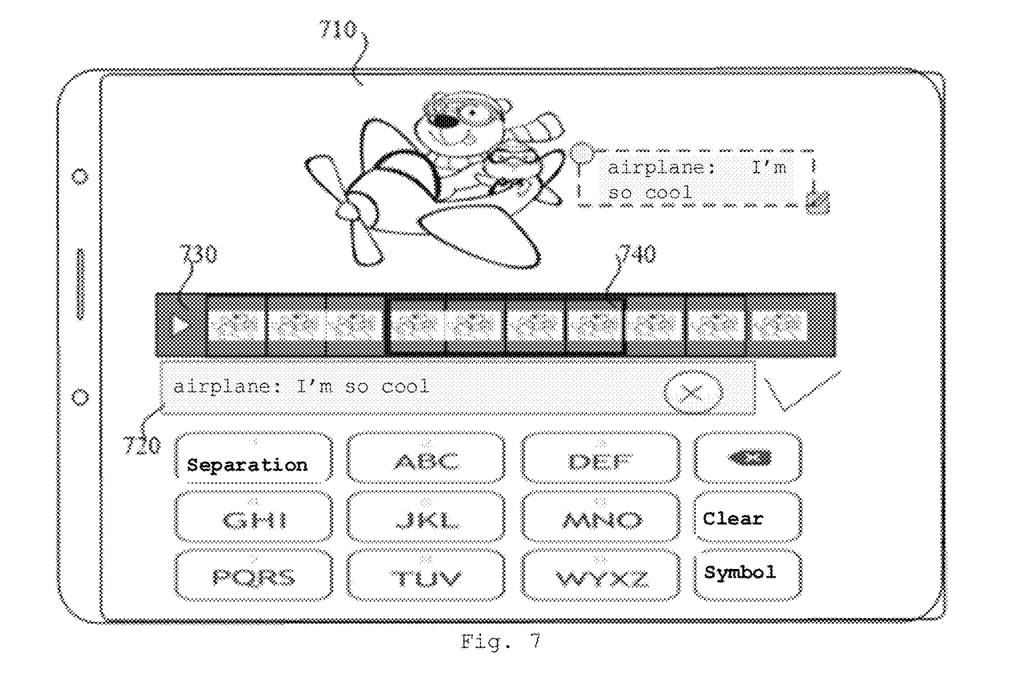
FIG. 7 is a schematic view of a bullet screen editing interface in an embodiment of the present disclosure.

In some embodiments, the bullet screen track is displayed on the video track by at least partially covering the video track, and the bullet screen track is displayed differently from the video track. For example, in a schematic view of a bullet screen editing interface as shown in FIG. 7, it comprises a video preview picture 710 of the video, a bullet screen editing box 720, the preview information of the bullet screen displayed on the video preview picture 710, a video track 730 of the video, and a bullet screen track 740 of the bullet screen. The bullet screen track 740 is displayed on the video track 730 by at least partially covering the video track 730, and the bullet screen track 740 is different from the video track 730.

In some embodiments, the adding position of the bullet screen in the video may be adjusted by adjusting the position of the bullet screen track 740 on the video track 730, and the display duration of the bullet screen in the video may be adjusted by adjusting the length of the bullet screen track 740.

In some embodiments, the video is a landscape video, the bullet screen editing interface is a landscape full-screen playback (or pause) page of the video, and the bullet screen preview box is displayed at an associated position of the object of the landscape full-screen playback (or pause) page. The associated position may be a position of the object (that is, the bullet screen preview box is superimposed on the object for display) or within a preset area range except for a position of the object. For example, the associated position is within an area at a distance from a peripheral contour of the object that is less than a preset length. The bullet screen track and the video track are displayed on the horizontal full-screen playback (or pause) page. The bullet screen track is displayed on the video track by at least partially covering the video track, and the bullet screen track is displayed differently from the video track. Thus, it is not only convenient to determine a corresponding relationship between the bullet screen and the video, but also reduces the blocking of the full-screen playback page by the bullet screen and the video track. Moreover, due to the fusion of the video full-screen page and the bullet screen editing page, it is possible to realize the bullet screen editing and adding and full-screen preview at the same time in the landscape full-screen playback scene without performing zoom-out and page switch on the video picture area, which may improve the interactive experience of the user.

In addition, the bullet screen track may also be displayed outside the video track and displayed in parallel with the video track.

Figure 8:
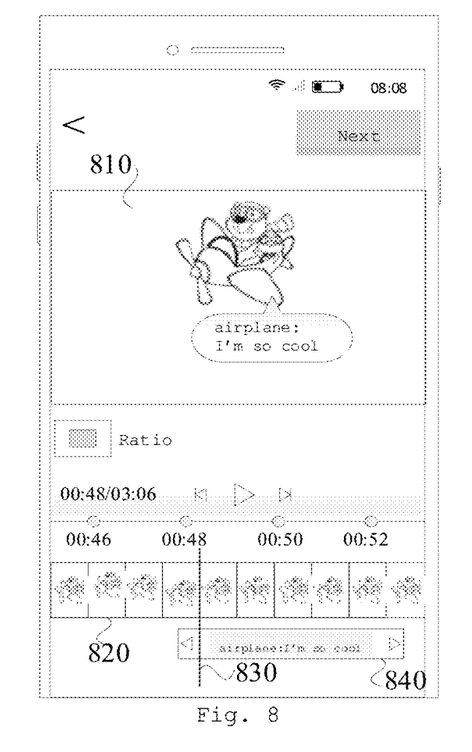
FIG. 8 is a schematic view of a bullet screen editing interface in an embodiment of the present disclosure.

In other embodiments, referring to a schematic view of a bullet screen editing interface as shown in FIG. 8, a video preview picture 810 of the video, a time axis 820 consisting of video frame sequences of the video are displayed on the bullet screen editing interface; the video preview picture 810 is switched to a screen of a video frame corresponding to a cursor 830 to change the adding position of the bullet screen in the video in response to a first operation of dragging the cursor 830 on the time axis 820; wherein the cursor 830 is associated with a duration track 840, and the display duration of the bullet screen on the video picture may be changed by changing the length of the duration track 840.

Figure 9:
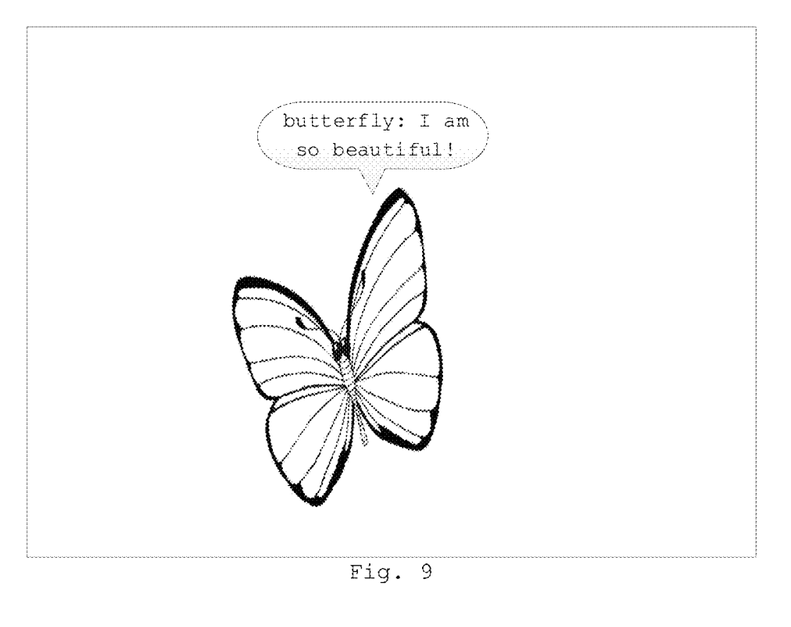
FIG. 9 is a schematic view of a playback picture of a video added with a bullet screen in an embodiment of the present disclosure.

In some embodiments, the bullet screen adding method further comprises: displaying the bullet screen on a video playback picture during the video playback process in response to completed adding of the bullet screen. The bullet screen comprises a bullet screen box and a bullet screen content in the bullet screen box, wherein the display style of the bullet screen box is the same as that of the bullet screen preview box, and the bullet screen content is the same as the bullet screen preview content. For example, in a schematic view of a playback picture of the video with a bullet screen as shown in FIG. 9, the scene of the playback picture of the video comprises: the object is a butterfly that dances gracefully, and the bullet screen is "butterfly: I am so beautiful!".

In some embodiments, the bullet screen adding method further comprises: displaying a control for sending a same bullet screen in response to a trigger operation for the bullet screen on the video playback picture; and displaying a bullet screen adding control in response to a trigger operation for the control for sending a same bullet screen (template application control). The bullet screen editing panel as shown in FIG. 3 comprises a bullet screen adding control 310. The template application control is a control that applies a bullet screen template.

During the video playback process, in response to the bullet screen being displayed on the video playback picture and a trigger operation, such as a long press operation, for the bullet screen on the video playback picture, a control for sending a same bullet screen is displayed to apply the same bullet screen template as the bullet screen. In response to a trigger operation, such as a click operation, for the control for sending a same bullet screen, the bullet screen adding control of the bullet screen is displayed, or the step of directly switching to the bullet screen editing interface of the bullet screen is performed. Thus, the interactive atmosphere of the bullet screen comments between the users is enhanced, and the interactive path of applying a bullet screen template by the live viewing user is shortened, thereby improving the user experience.

In addition, in addition to displaying a control for sending a same bullet screen, it is also possible to display a like control, and give a like to the bullet screen by triggering the like control.

In some embodiments, in response to a trigger operation for the bullet screen on the video playback picture, a deletion control may also be displayed in addition to displaying a control for sending a same bullet screen and a like control, and the bullet screen may be deleted in response to a trigger operation for the deletion control.

In some embodiments, the step of displaying the bullet screen on a video playback picture during a playback process of the video in response to completed adding of the bullet screen comprises: displaying the bullet screen at an associated position of the object on the video playback picture in response to completed adding of the bullet screen in the case where the video playback picture comprises the object; and canceling displaying the bullet screen in the video frame to ensure that the bullet screen is associated with the object and both of them appear at the same time in response to the video playback picture not comprising the object.

Figure 10:
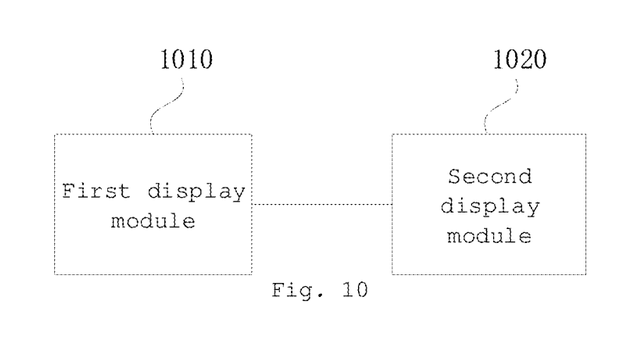
FIG. 10 is a schematic structural view of a bullet screen adding apparatus in an embodiment of the present disclosure.

FIG. 10 is a schematic structural view of a bullet screen adding apparatus in an embodiment of the present disclosure. As shown in FIG. 10, the bullet screen adding apparatus specifically comprises: a first display module 1010 and a second display module 1020.

The first display module 1010 is configured to display a bullet screen editing interface in response to an adding request for a bullet screen for a video, wherein a video preview picture of the video is displayed on the bullet screen editing interface; and the second display module 1020 is configured to display the preview information of the bullet screen on the video preview picture displayed on the bullet screen editing interface in response to a bullet screen editing operation, wherein the bullet screen is an associated bullet screen of the object in the video.

In some embodiments, a plurality of style options are displayed on the bullet screen editing interface; and the bullet screen adding apparatus further comprises: an application module configured to take a style corresponding to a style option as a display style of the bullet screen in response to a trigger operation for the style option among the plurality of style options.

In some embodiments, the video track of the video and the bullet screen track of the bullet screen are displayed on the bullet screen editing interface; and the bullet screen adding apparatus further comprises: a determining module configured to determine a video frame corresponding to the bullet screen in response to an adjustment operation for the bullet screen track to display the bullet screen on a video playback picture corresponding to the video frame during a playback process of the video.

In some embodiments, the bullet screen track is displayed on the video track by at least partially covering the video track, and the bullet screen track is displayed differently from the video track.

In some embodiments, the bullet screen adding apparatus further comprises: a third display module configured to display the bullet screen on a video playback picture during the video playback process in response to completed adding of the bullet screen.

In some embodiments, the third display module is specifically configured to: display the bullet screen at an associated position of the object on the video playback picture in response to completed adding of the bullet screen and the video playback picture comprises the object; and canceling displaying the bullet screen in the video frame in response to the video playback picture does not comprise the object. In other words, since the bullet screen is an associated bullet screen of the object, the bullet screen and the object are displayed synchronously on the video picture, thereby enhancing the display effect of the bullet screen and the user's cognition of the bullet screen.

In some embodiments, the bullet screen adding apparatus further comprises: a fourth display module configured to display a control for sending a same bullet screen in response to a trigger operation for the bullet screen on the video playback picture; and a fifth display module configured to display the bullet screen adding control or directly switch to the bullet screen editing interface of the bullet screen in response to a trigger operation for the control for sending a same bullet screen.

In some embodiments, the first display module 1010 is specifically configured to display a bullet screen adding control in response to the user having access to add the bullet screen; and display a bullet screen editing interface of the bullet screen in response to a trigger operation for the bullet screen adding control.

The bullet screen adding apparatus provided by the embodiment of the disclosure realizes a novel bullet screen adding solution, which is conductive to improving the bullet screen adding effect and the user experience.

The bullet screen adding apparatus provided by the embodiment of the present disclosure may perform the steps in the bullet screen adding method provided by the method embodiments of the present disclosure, which will not be described in detail here for the implementing steps and the beneficial effects.

Figure 11:
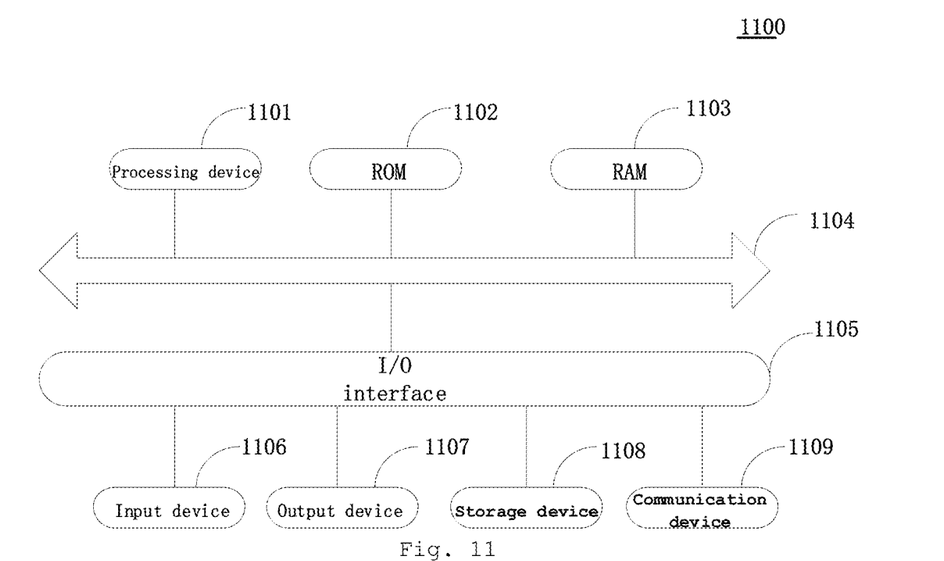
FIG. 11 is a schematic structural view of an electronic device in an embodiment of the present disclosure.

FIG. 11 is a schematic structural view of an electronic device in an embodiment of the present disclosure. Next, specifically refer to FIG. 11, which shows a schematic structural view of an electronic device 1100 suitable for implementing the embodiment of the present disclosure. The electronic device 1100 in the embodiment of the present disclosure may comprise, but is not limited to, mobile terminals such as mobile phones, notebook computers, digital broadcast receivers, PDA (personal digital assistant), PAD (pad computer), PMP (Portable Multimedia Player), in-vehicle terminals (for example, in-vehicle navigation terminals) and wearable electronic devices; and fixed terminals such as digital TVs, desktop computers and smart home devices. The electronic device shown in FIG. 11 which is only an example, shall not limit the functions and application range of the embodiments of the present disclosure.

As shown in FIG. 11, the electronic device 1100 may comprise a processing device (for example, a central processing unit, a graphic processor, and the like) 1101, which may perform various suitable actions and processing according to a program stored in a Read-only Memory (ROM) 1102 or a program loaded from a storage device 1108 into a Random Access Memory (RAN) 1103 to implement the method in an embodiment according to the present disclosure. In the RAM 1103, various programs and data required for the operation of the electronic device 1100 are also stored. The processing device 1101, the ROM 1102 and the RAM 1103 are connected to each other through a bus 1104. The input/output (I/O) interface 1105 is also connected to the bus 1104.

Generally, the following devices may be connected to the I/O interface 1105: an input device 1106 including, for example, a touch screen, a touch pad, a keyboard, a mouse, a camera, a microphone, an accelerometer, a gyroscope, and the like; an output device 1107 including, for example, a Liquid Crystal Display (LCD), a speaker, a vibrator, and the like; a storage device 1108 including, for example, a magnetic tape, a hard disk, and the like; and a communication device 1109. The communication device 1109 may allow the electronic device 1100 to be in wireless or wired communication with other devices to exchange data. Although FIG. 11 shows the electronic device 1100 with various devices, it should be understood that there is no requirement to implement or have all the devices shown. It is possible to alternatively implement or possess more or less devices.

In particular, according to an embodiment of the present disclosure, the process described above with reference to the flowchart may be implemented as a computer software program. For example, in an embodiment of the present disclosure, there comprises a computer program product, which comprises a computer program carried on a non-transient computer-readable medium, wherein the computer program contains program codes for performing the method shown in the flowchart so as to implement the method described above. In such embodiment, the computer program may be downloaded and installed from the network through the communication device 1109, installed from the storage device 1108, or installed from the ROM 1102. When the computer program is executed by the processing device 1101, the above-described functions defined in the method of the embodiment of the present disclosure are performed.

It is to be noted that, the above-described computer-readable medium of the present disclosure may be a computer-readable signal medium, a non-transitory computer-readable storage medium or any combination thereof. The non-transitory computer-readable storage medium may be, for example, but is not limited to: an electrical, magnetic, optical, electromagnetic, infrared, or semiconductor system, device, or apparatus, or a combination thereof. More specific examples of the non-transitory computer-readable storage medium may comprise, but is not limited to: an electrical connection having one or more wires, a portable computer disk, a hard disk, a random access memory (RA), a read-only memory (ROM), an erasable programmable read-only memory (EPROM or flash memory), an optical fiber, a portable compact disk read-only memory (CD-ROM), an optical storage device, a magnetic storage device, or any suitable combination thereof. In the present disclosure, a non-transitory computer-readable storage medium may be any tangible medium that contains or stores a program which may be used by an instruction execution system, apparatus, or device or used in combination therewith. In the present disclosure, the computer-readable signal medium may comprise a data signal propagated in a baseband or as a part of a carrier wave, wherein a computer-readable program code is carried. Such propagated data signal may take many forms, including but not limited to an electromagnetic signal, an optical signal, or any suitable combination thereof. The computer-readable signal medium may also be any computer-readable medium other than the non-transitory computer-readable storage medium. The computer-readable signal medium may send, propagate, or transmit a program for use by an instruction execution system, apparatus, or device or in combination with therewith. The program code contained on the computer-readable medium may be transmitted by any suitable medium, including but not limited to: a wire, an optical cable, radio frequency (RF), and the like, or any suitable combination thereof.

In some embodiments, the client and the server may communicate using any currently known or future developed network protocol such as HTTP (HyperText Transfer Protocol), and may be interconnected with digital data communication in any form or medium (for example, communication network). Examples of communication networks comprise a Local Area Network ("LAN"), a Wide Area Network ("WAN"), an extranet (for example, Internet) and an end-to-end network (for example, an ad hoc end-to-end network), as well as any currently known or future developed network.

The above-described computer-readable medium may be comprised in the above-described electronic device; or may also exist alone without being assembled into the electronic device.

The above-described computer-readable medium carries one or more programs that, when executed by the electronic device cause the electronic device to: display a bullet screen editing interface in response to an adding request for a bullet screen for a video, wherein a video preview picture of the video is displayed on the bullet screen editing interface; displaying the preview information of the bullet screen on the video preview picture displayed on the bullet screen editing interface in response to a bullet screen editing operation, wherein the bullet screen is an associated bullet screen of an object in the video.

The computer program code for performing the operations of the present disclosure may be written in one or more programming languages or a combination thereof. The above-described programming languages comprise but are not limited to object-oriented programming languages, such as Java, Smalltalk, and C++, and also comprise conventional procedural programming languages, such as "C" language or similar programming languages. The program code may be executed entirely on the user's computer, partly on the user's computer, executed as an independent software package, partly on the user's computer and partly executed on a remote computer, or entirely executed on the remote computer or server. In the case of a remote computer, the remote computer may be connected to the user's computer through any kind of network (including a local area network (LAN) or a wide area network (WAN)), or may be connected to an external computer (for example, connected through Internet using an Internet service provider).

The flowcharts and block views in the accompanying drawings illustrate the possibly implemented architectures, functions, and operations of the system, method, and computer program product according to various embodiments of the present disclosure. In this regard, each block in the flowchart or block view may represent a module, a program segment, or a part of code, wherein the module, the program segment, or the part of code contains one or more executable instructions for realizing a specified logic function. It should also be noted that, in some alternative implementations, the functions marked in the block may also occur in a different order from the order marked in the accompanying drawings. For example, two blocks shown in succession which may actually be executed substantially in parallel, may sometimes also be executed in a reverse order, depending on the functions involved. It should also be noted that each block in the block view and/or flowchart, and a combination of the blocks in the block view and/or flowchart, may be implemented by a dedicated hardware-based system that performs the specified functions or operations, or may be implemented by a combination of dedicated hardware and computer instructions.

The units involved in the described embodiments of the present disclosure may be implemented in software or hardware. Wherein, the names of the units do not constitute a limitation on the units themselves under certain circumstances.

The functions described hereinabove may be performed at least in part by one or more hardware logic components. For example, without limitation, the hardware logic components of a demonstrative type that may be used comprise: a Field Programmable Gate Array (FPGA), an Application Specific Integrated Circuit (ASIC), an Application Specific Standard Product (ASSP), a System on Chip (SOC), a Complex Programmable Logical device (CPLD) and the like.

In the context of the present disclosure, a machine-readable medium may be a tangible medium, which may contain or store a program for use by the instruction execution system, apparatus, or device or use in combination with the instruction execution system, apparatus, or device. The machine-readable medium may be a machine-readable signal medium or a non-transitory machine-readable storage medium. The machine-readable medium may comprise, but is not limited to, an electronic, magnetic, optical, electromagnetic, infrared, or semiconductor system, device or device, or any suitable combination thereof. More specific examples of the non-transitory machine-readable storage medium may comprise an electrical connection based on one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof.

According to one or more embodiments of the present disclosure, the present disclosure provides a bullet screen adding method, comprising: displaying a bullet screen editing interface in response to an adding request for a bullet screen for a video, wherein a video preview picture of the video is displayed on the bullet screen editing interface; and displaying the preview information of the bullet screen on the video preview picture displayed on the bullet screen editing interface in response to a bullet screen editing operation, wherein the bullet screen is an associated bullet screen of an object in the video.

According to one or more embodiments of the present disclosure, in the bullet screen adding method provided by the present disclosure, alternatively, the method further comprises: displaying a plurality of style options on the bullet screen editing interface; and taking a style corresponding to a style option as a display style of the bullet screen in response to a trigger operation for the style option among the plurality of style options.

According to one or more embodiments of the present disclosure, in the bullet screen adding method provided by the present disclosure, alternatively, the preview information of the bullet screen comprises a bullet screen preview box and/or a bullet screen preview content, wherein the bullet screen preview box is displayed according to an adjusted style in response to an adjustment operation for a style of the bullet screen, and/or the bullet screen preview content is displayed according to an adjusted content in response to an adjustment operation for a content of the bullet screen.

According to one or more embodiments of the present disclosure, in the bullet screen adding method provided by the present disclosure, alternatively, the method further comprises: displaying a video track of the video and a bullet screen track of the bullet screen on the bullet screen editing interface; and determining a video frame corresponding to the bullet screen in response to an adjustment operation for the bullet screen track to display the bullet screen on a video playback picture corresponding to the video frame during a playback process of the video.

According to one or more embodiments of the present disclosure, in the bullet screen adding method provided by the present disclosure, alternatively, the bullet screen track is displayed on the video track by at least partially covering the video track, and the bullet screen track is different from the video track display.

According to one or more embodiments of the present disclosure, in the bullet screen adding method provided by the present disclosure, alternatively, the method further comprises: displaying the bullet screen on a video playback picture during a playback process of the video in response to completed adding of the bullet screen.

According to one or more embodiments of the present disclosure, in the bullet screen adding method provided by the present disclosure, alternatively, the step of displaying the bullet screen on a video playback picture during a playback process of the video in response to completed adding of the bullet screen comprises: displaying the bullet screen at an associated position of the object on the video playback picture in response to completed adding of the bullet screen; and canceling displaying the bullet screen in the video frame and the video playback picture not comprising the object.

According to one or more embodiments of the present disclosure, in the bullet screen adding method provided by the present disclosure, alternatively, the method further comprises: displaying a control for sending a same bullet screen in response to a trigger operation for the bullet screen on the video playback picture; and displaying the bullet screen adding control or directly switching to the bullet screen editing interface of the bullet screen in response to a trigger operation for the control for sending a same bullet screen.

According to one or more embodiments of the present disclosure, in the bullet screen adding method provided by the present disclosure, alternatively, the step of displaying a bullet screen editing interface in response to an adding request for a bullet screen for a video comprises: displaying a bullet screen adding control in response to the user having an access to add the bullet screen; and displaying a bullet screen editing interface of the bullet screen in response to a trigger operation for the bullet screen adding control.

According to one or more embodiments of the present disclosure, the present disclosure provides a bullet screen adding apparatus, comprising: according to one or more embodiments of the present disclosure, in the bullet screen adding apparatus provided by the present disclosure, alternatively, a first display module configured to display a bullet screen editing interface in response to an adding request for a bullet screen for a video, wherein a video preview picture of the video is displayed on the bullet screen editing interface; and a second display module configured to display the preview information of the bullet screen on the video preview picture displayed on the bullet screen editing interface in response to a bullet screen editing operation, wherein the bullet screen is an associated bullet screen of an object in the video.

According to one or more embodiments of the present disclosure, the present disclosure provides an electronic device, comprising: one or more processors; and a memory for storing one or more programs that, in response to being executed by the one or more processors, cause the one or more processors to implement the bullet screen adding method as provided in any of the present disclosure.

According to one or more embodiments of the present disclosure, the present disclosure provides a non-transitory computer-readable storage medium having a computer program stored thereon that, in response to being executed by a processor, implements the bullet screen adding method as provided in any of the present disclosure.

The embodiment of the present disclosure also provides a computer program product including a computer programs or instructions that, in response to being executed by a processor, implement the bullet screen adding method as described above.

The embodiment of the present disclosure also provides a computer program including instructions that, in response to being executed by a processor, cause the processor to perform the bullet screen adding method as described above.

Compared with the related art, the technical solution provided by the embodiment of the present disclosure has at least the following advantages:

In the bullet screen adding method provided by the embodiment of the disclosure, a bullet screen editing interface is displayed in response to an adding request for a bullet screen for a video, wherein a video preview picture of the video is displayed on the bullet screen editing interface; and the preview information of the bullet screen is displayed on the video preview picture displayed on the bullet screen editing interface in response to a bullet screen editing operation, wherein the bullet screen is a technical means of an associated bullet screen of the object in the video, thereby enriching the bullet screen interaction scenes and contributing to improving the interactive experience of the user.

The above description is only an explanation of preferred embodiments of the present disclosure and the applied technical principles. Those skilled in the art should understand that the scope of disclosure involved in this disclosure is not limited to the technical solutions formed by the specific combination of the above technical features, and at the same time should also cover other technical solutions formed by arbitrarily combining the above-described technical features or equivalent features without departing from the above disclosed concept. For example, the above-described features and the technical features disclosed in the present disclosure (but not limited thereto) having similar functions are replaced with each other to form a technical solution.

In addition, although the operations are depicted in a specific order, this should not be understood as requiring these operations to be performed in the specific order shown or performed in a sequential order. Under certain circumstances, multitasking and parallel processing might be advantageous. Likewise, although several specific implementation details are contained in the above discussion, these should not be construed as limiting the scope of the present disclosure. Certain features that are described in the context of individual embodiments may also be implemented in combination in a single embodiment. On the contrary, various features described in the context of a single embodiment may also be implemented in multiple embodiments individually or in any suitable sub-combination.

Although the present subject matter has been described in language specific to structural features and/or methodological actions, it should be understood that the subject matter defined in the appended claims is not necessarily limited to the specific features or actions described above. On the contrary, the specific features and actions described above are only exemplary forms of implementing the claims.

What is claimed is:

1. A comment adding method comprising:
   displaying a comment editing interface in response to an adding request for a comment for a video, wherein a video preview picture of the video is displayed on the comment editing interface;
   displaying preview information of the comment on the video preview picture displayed on the comment editing interface in response to a comment editing operation, wherein the comment is an associated comment of an object in the video;
   displaying a video track of the video and a comment track of the comment on the comment editing interface; and
   determining a video frame corresponding to the comment in response to an adjustment operation for the comment track to display the comment on a video playback picture corresponding to the video frame during a playback process of the video.

2. The comment adding method according to claim 1, further comprising:
   displaying a plurality of style options on the comment editing interface; and
   taking a style corresponding to a style option as a display style of the comment in response to a trigger operation for the style option among the plurality of style options.

3. The comment adding method according to claim 1, wherein:
   the preview information of the comment comprises a comment preview box, and the comment preview box is displayed according to an adjusted style in response to an adjustment operation for a style of the comment; and/or the preview information of the comment comprises a comment preview content, and the comment preview content is displayed according to an adjusted content in response to an adjustment operation for a content of the comment.

4. The comment adding method according to claim 3, wherein:
the style adjustment operation comprises at least one of changing a size of the comment preview box, moving the comment preview box and deleting the comment preview box; and/or
the content adjustment operation comprises at least one of the following:
deleting the preview content of the comment;
adding the preview content of the comment; and
setting a font, font size and color of the comment preview content.

5. The comment adding method according to claim 1, wherein:
the comment track is displayed on the video track by at least partially covering the video track, and the comment track is displayed differently from the video track; or
the comment track is displayed outside the video track and displayed in parallel with the video track.

6. The comment adding method according to claim 1, wherein the determining a video frame corresponding to the comment in response to an adjustment operation for the comment track comprises:
adjusting an adding position of the comment in the video in response to the adjustment operation for the comment track; and
adjusting a display duration of the comment in the video in response to the adjustment operation for the comment track.

7. The comment adding method according to claim 1, wherein:
the comment editing interface displays a time axis consisting of video frame sequences of the video; and
the comment adding method further comprises at least one of the following:
switching the video preview picture to a picture of a video frame corresponding to a cursor to change an adding position of the comment in the video in response to the operation of dragging the cursor on the time axis; and
changing a display duration of the comment on the video picture in response to the cursor being associated with a duration track and changing a length of a duration track.

8. The comment adding method according to claim 1, further comprising:
displaying the comment on the video playback picture during the playback process of the video in response to completed adding of the comment.

9. The comment adding method according to claim 8, wherein the displaying the comment on the video playback picture during the playback process of the video in response to completed adding of the comment comprises:
displaying the comment at an associated position of the object on a video playback picture in response to completed adding of the comment and the video playback picture comprising the object; and
canceling displaying the comment in the video frame in response to the video playback picture not comprising the object.

10. The comment adding method according to claim 8, further comprising:

displaying a control for sending a same comment in response to a trigger operation for the comment on the video playback picture; and
displaying a comment adding control or switching to a bullet screen editing interface of the comment in response to a trigger operation for the control for sending a same comment.

11. The comment adding method according to claim 8, further comprising:
displaying at least one of a like control and a deletion control in response to a trigger operation for the comment on the video playback picture;
giving a like to the comment in response to a trigger operation for the like control; and
deleting the comment in response to a trigger operation for the deletion control.

12. The comment adding method according to claim 1, wherein the displaying a comment editing interface in response to an adding request for a comment for a video comprises:
displaying a comment adding control in response to a user having an access to add the comment; and
displaying a comment editing interface of the comment in response to a trigger operation for a comment adding control.

13. The comment adding method according to claim 12, wherein a prompt message is displayed to guide a user to take part in a comment interaction in response to the user obtaining the access to add the comment.

14. The comment adding method according to claim 13, wherein the prompt message is used to switch to the comment editing interface of the comment or switch to an interface displaying the comment adding control, and the comment adding control is configured to trigger the adding request for the comment.

15. The comment adding method according to claim 1, wherein the adding request for the comment is triggered by operating a comment adding control displayed on a playback picture or video detail page of the video.

16. A comment adding apparatus, comprising:
a first display module configured to display a comment editing interface in response to an adding request for a comment for a video, wherein a video preview picture of the video is displayed on the comment editing interface, wherein a video track of the video and a comment track of the comment are displayed on the comment editing interface;
a second display module configured to display preview information of the comment on the video preview picture displayed on the comment editing interface in response to a comment editing operation, wherein the comment is an associated comment of an object in the video; and
a determining module configured to determine a video frame corresponding to the comment in response to an adjustment operation for the comment track to display the comment on a video playback picture corresponding to the video frame during a playback process of the video.

17. An electronic device, comprising:
one or more processors; and
a storage for storing one or more programs that, in response to being executed by the one or more processors, cause the one or more processors to implement a comment adding method according to claim 1.

18. A non-transitory computer-readable storage medium having a computer program stored thereon that, when executed by a processor, implements a comment adding method, comprising:
- displaying a comment editing interface in response to an adding request for a comment for a video, wherein a video preview picture of the video is displayed on the comment editing interface;
- displaying preview information of the comment on the video preview picture displayed on the comment editing interface in response to a comment editing operation, wherein the comment is an associated comment of an object in the video;
- displaying a video track of the video and a comment track of the comment on the comment editing interface; and
- determining a video frame corresponding to the comment in response to an adjustment operation for the comment track to display the comment on a video playback picture corresponding to the video frame during a playback process of the video.

19. The non-transitory computer-readable storage medium according to claim 18, wherein the comment adding method further comprises:
- displaying a plurality of style options on the comment editing interface; and
- taking a style corresponding to a style option as a display style of the comment in response to a trigger operation for the style option among the plurality of style options.

\* \* \* \* \*